United States Patent
Kim et al.

(10) Patent No.: US 10,014,505 B2
(45) Date of Patent: Jul. 3, 2018

(54) SEPARATOR HAVING HIGH HEAT RESISTANCE, MANUFACTURING METHOD THEREOF AND SECONDARY BATTERY INCLUDING THE SEPARATOR

(71) Applicant: Samsung SDI Co., Ltd., Yongin-si, Gyeonggi-do (KR)

(72) Inventors: Hyungbae Kim, Yongin-si (KR); Jonghwan Park, Yongin-si (KR); Byeonggyu Cho, Yongin-si (KR); Eungyeong Lee, Yongin-si (KR); Jinhyuk In, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 134 days.

(21) Appl. No.: 14/918,366

(22) Filed: Oct. 20, 2015

(65) Prior Publication Data

US 2016/0149186 A1    May 26, 2016

(30) Foreign Application Priority Data

Nov. 21, 2014  (KR) .................. 10-2014-0163726

(51) Int. Cl.
- *H01M 2/16* (2006.01)
- *H01M 2/14* (2006.01)
- *H01M 10/0525* (2010.01)

(52) U.S. Cl.
CPC ......... *H01M 2/1686* (2013.01); *H01M 2/145* (2013.01); *H01M 2/166* (2013.01); *H01M 2/1653* (2013.01); *H01M 10/0525* (2013.01)

(58) Field of Classification Search
CPC .................................................. H01M 2/166
See application file for complete search history.

(56) References Cited

U.S. PATENT DOCUMENTS

| | | | |
|---|---|---|---|
| 5,371,110 A | 12/1994 | Philipp et al. | |
| 2009/0111026 A1 | 4/2009 | Kim et al. | |
| 2009/0325058 A1 | 12/2009 | Katamaya et al. | |
| 2011/0027658 A1 | 2/2011 | Kim et al. | |
| 2011/0141661 A1 | 6/2011 | Muthu et al. | |
| 2012/0301774 A1* | 11/2012 | Jiang ............ | H01M 2/145 429/144 |
| 2013/0034651 A1 | 2/2013 | Buqa et al. | |
| 2013/0252110 A1 | 9/2013 | Park et al. | |
| 2013/0302661 A1 | 11/2013 | Kim et al. | |
| 2014/0023908 A1* | 1/2014 | Ueki ............. | H01M 2/166 429/144 |
| 2016/0093858 A1 | 3/2016 | Saegusa et al. | |
| 2016/0149186 A1 | 5/2016 | Kim et al. | |
| 2016/0164099 A1 | 6/2016 | Wang et al. | |
| 2016/0181618 A1 | 6/2016 | Hoshiba | |

FOREIGN PATENT DOCUMENTS

| | | |
|---|---|---|
| EP | 2 166 602 A1 | 3/2010 |
| KR | 10-0727248 B1 | 6/2007 |
| KR | 10-2010-0049246 A | 5/2010 |
| KR | 10-2011-0011932 A | 2/2011 |
| KR | 10-2013-0016061 A | 2/2013 |
| KR | 10-2014-0026009 A | 3/2014 |

OTHER PUBLICATIONS

U.S. Office Action dated May 30, 2017 for U.S. Appl.No. 14/918,454, which is related to subject U.S. Appl. No. 14/918,366.
Zhao et al., "Dispersion of barium titanate with poly(acrylic acid-co-maleic acid) in aqueous media," *Ceramics International* 30 (2004) 1985-1988.
U.S. Final Office Action dated Oct. 12, 2017 for U.S. Appl. No. 14/918,454, which is related to subject U.S. Appl. No. 14/918,366.

* cited by examiner

*Primary Examiner* — Ladan Mohaddes
(74) *Attorney, Agent, or Firm* — Knobbe, Martens, Olson & Bear, LLP

(57) ABSTRACT

Provided are a separator having high heat resistance, a manufacturing method thereof and a secondary battery including the separator, which provides excellent dispersibility and reduced thermal shrinkage. The separator includes separator includes a porous base layer, and a coating layer formed on at least one surface of the base layer, wherein the coating layer includes inorganic particles and a binder, and the binder includes one selected from the group consisting of polyacrylic acid (PAA), polyacrylate or a mixture of polyacrylic acid (PAA) and polyacrylate, having a molecular weight of 100,000 to 1,000,000, as a first binder.

11 Claims, 5 Drawing Sheets

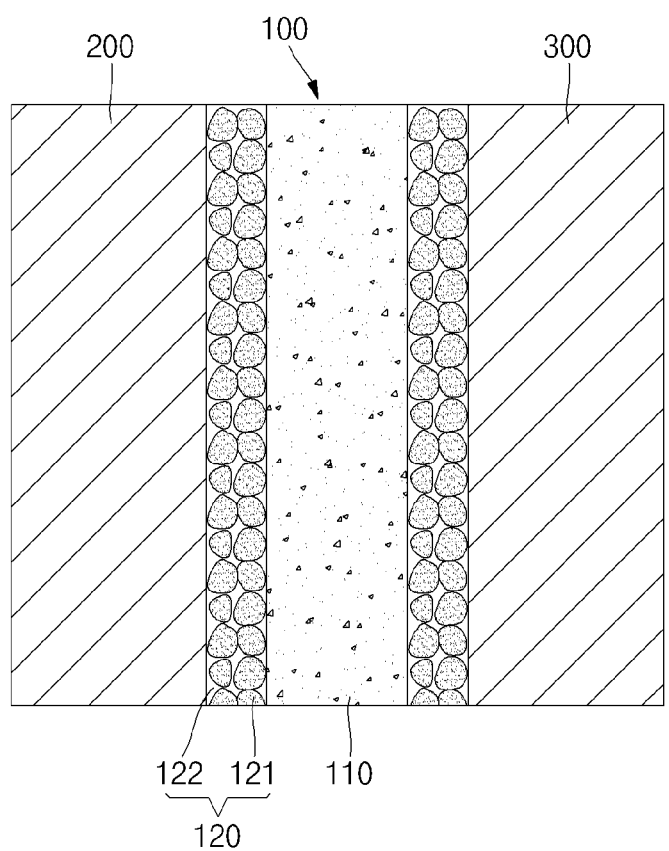

FIG. 4A
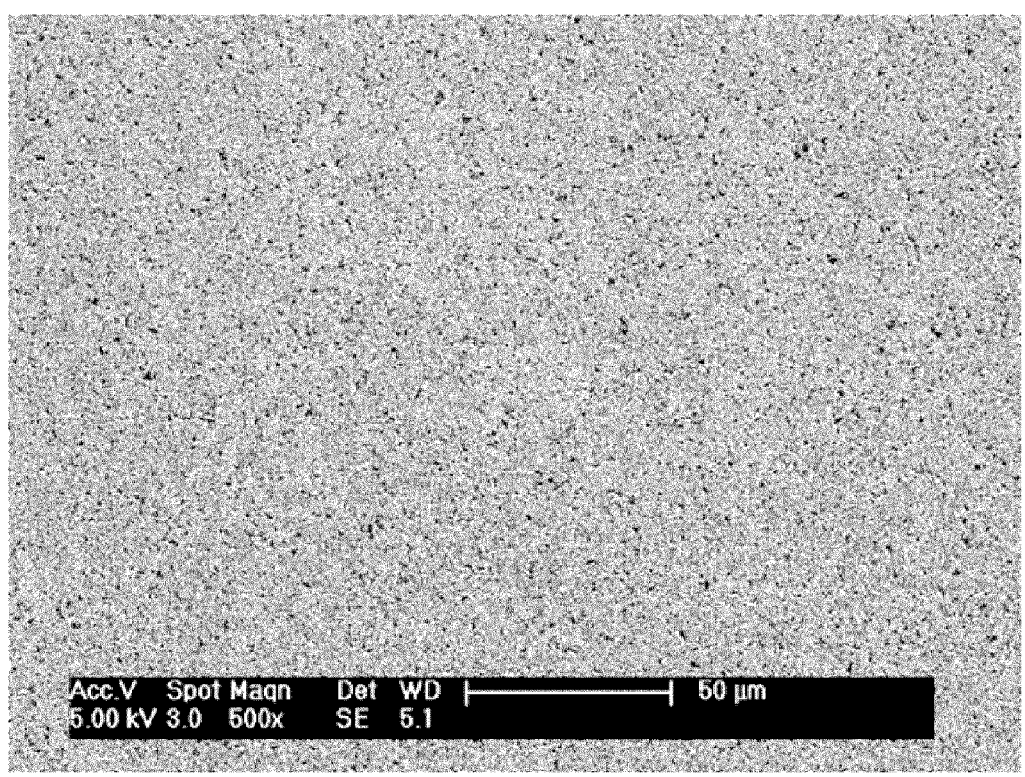

FIG. 4B
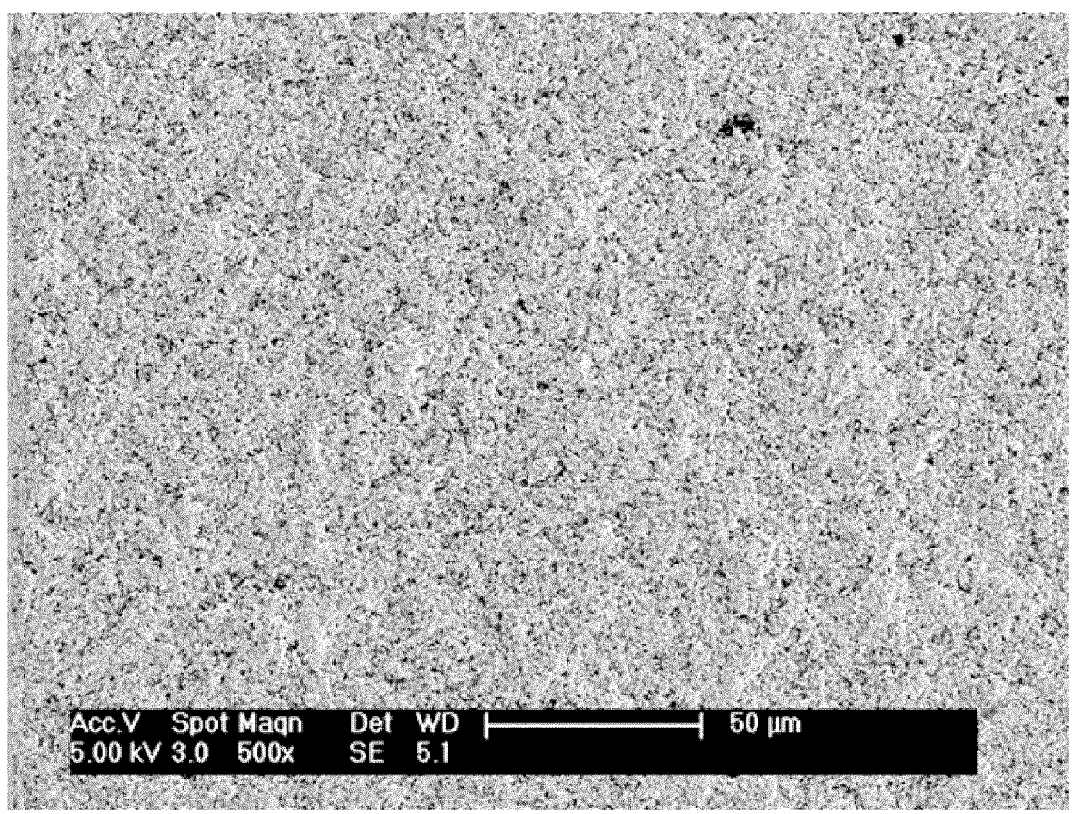

SEPARATOR HAVING HIGH HEAT RESISTANCE, MANUFACTURING METHOD THEREOF AND SECONDARY BATTERY INCLUDING THE SEPARATOR

CROSS-REFERENCE TO RELATED APPLICATION

This application claims priority to and the benefit of Korean Patent Application No. 10-2014-0163726 filed on Nov. 21, 2014 in the Korean Intellectual Property Office, the disclosure of which is incorporated herein in its entirety by reference.

BACKGROUND

Field

The present disclosure relates to a separator having high heat resistance, a manufacturing method thereof and a secondary battery having the separator.

Description of the Related Technology

In general, a secondary battery can be repeatedly charged and discharged, unlike a primary battery that cannot be recharged. A low-capacity secondary battery is typically used for a small portable electronic device such as a smart phone, a tablet computer, digital camera and the like. A large-capacity secondary battery, obtained by connecting multiple battery cells in a pack shape, is widely used as a power supply for driving a motor of an electric bicycle, an electric scooter, a hybrid vehicle, an electric vehicle and the like.

Secondary batteries are manufactured in various shapes, for example, a prismatic shape, a cylindrical shape and a pouch shape. In general a secondary battery includes an electrode assembly including a positive electrode plate, a negative electrode plate with a separator interposed between, and a case accommodating the electrode assembly together with an electrolyte solution.

SUMMARY

The present disclosure provides a separator having high heat resistance, which provides excellent dispersibility and reduced thermal shrinkage, a manufacturing method thereof and a secondary battery including the separator.

The above and other objects of the present disclosure will be described in or be apparent from the following description of the preferred embodiments.

Some embodiments provide a separator including a porous base layer, and a coating layer formed on at least one surface of the base layer, wherein the coating layer includes inorganic particles and a binder, and the binder includes one selected from the group consisting of polyacrylic acid (PAA), polyacrylate or a mixture of polyacrylic acid (PAA) and polyacrylate, having a molecular weight of 100,000 to 1,000,000, as a first binder.

In some embodiments, the polyacrylate may be sodium polyacrylate.

In some embodiments, the binder may be a mixture of the first binder and a second binder, and the second binder may be one water-based binder selected from the group consisting of a styrene-butadiene rubber (SBR), carboxyl methyl cellulose (CMC) and acrylate.

In some embodiments, the first binder may be contained in an amount of 50 wt % or greater based on the total weight of the binder.

In some embodiments, the first binder and the second binder may be contained in the binder in a mixing ratio of 50:50 to 100:0.

In some embodiments, the first binder and the second binder may be contained in the binder in a mixing ratio of 60:40 to 70:30.

Some embodiments provide a secondary battery including the separator.

In some embodiments a manufacturing method of a separator, including preparing a porous base layer; preparing a slurry by mixing inorganic particles, a binder and a solvent; and forming a coating layer by coating the slurry on at least one surface of the base layer and drying the coated slurry, wherein the binder includes one selected from the group consisting of polyacrylic acid (PAA), polyacrylate or a mixture of polyacrylic acid (PAA) and polyacrylate, having a molecular weight of 100,000 to 1,000,000, as a first binder.

In some embodiments, the polyacrylate may be sodium polyacrylate.

In some embodiments, the binder may be a mixture of the first binder and a second binder, and the second binder may be one water-based binder selected from the group consisting of a styrene-butadiene rubber (SBR), carboxyl methyl cellulose (CMC) and acrylate.

In some embodiments, the first binder may be contained in an amount of 50 wt % or greater based on the total weight of the binder.

Some embodiments provide a manufacturing method wherein the first binder and the second binder are contained in the binder in a mixing ratio of 50:50 to 100:0.

Some embodiments provide a manufacturing method wherein the first binder and the second binder are contained in the binder in a mixing ratio of 60:40 to 70:30.

As described above, according to the separator having high heat resistance, the manufacturing method thereof and the secondary battery including the separator, excellent dispersibility and reduced thermal shrinkage can be provided by forming a coating layer including a binder containing a polyacrylic acid or sodium polyacrylate in a base layer.

BRIEF DESCRIPTION OF THE DRAWINGS

The above and other features and advantages of the present embodiments will become more apparent by describing in detail certain embodiments thereof with reference to the attached drawings in which:

FIG. 3 is a cross-sectional view of a secondary battery including a separator according to an embodiment; and FIGS. 4A to 4C are photographs showing dispersibility of a separator according to an embodiment.

DETAILED DESCRIPTION

Figure 1:
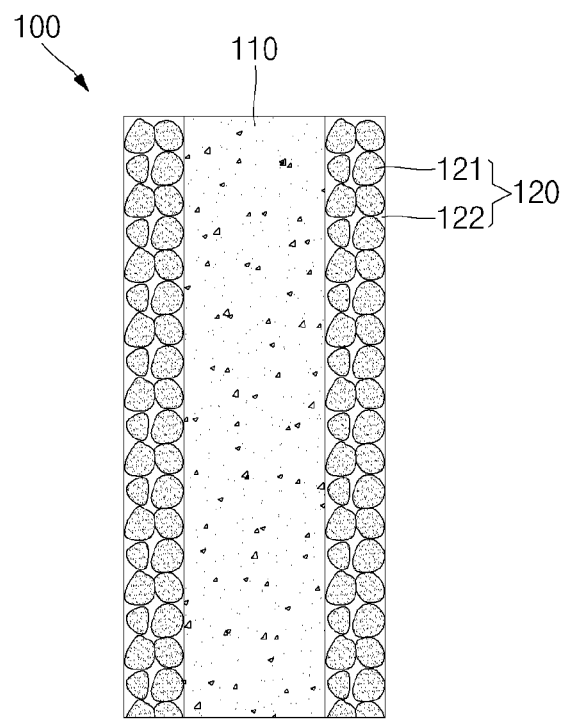
FIG. 1 is a cross-sectional view of a separator according to an embodiment.

Reference will now be made in detail to the certain embodiments of the present disclosure examples of which are illustrated in the accompanying drawings.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

In the drawings, the thickness of layers and regions are exaggerated for clarity. Here, like reference numerals refer to like elements throughout. As used herein, the term "and/or" includes any and all combinations of one or more of the associated listed items.

In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises," and/or "comprising," when used in this specification, specify the presence of stated features, numbers, steps, operations, elements, and/or components, but do not preclude the presence or addition of one or more other features, numbers, steps, operations, elements, components, and/or groups thereof.

FIG. 1 is a cross-sectional view of a separator according to an embodiment.

Referring to FIG. 1, the separator 100 according to an embodiment includes a base layer 110 and a coating layer 120.

The base layer 110 may be formed of a porous membrane having a plurality of fine pores. Since there are many places in the base layer 110 to be filled with an electrolyte due to porosity, lithium ions can be easily transferred between positive and negative electrodes of a secondary battery. The base layer 110 may include, for example, glass fiber, polyester, tetrafluoroethylene (TEFLON), polyolefin, polytetrafluoroethylene (PTFE) or combinations thereof. The polyolefin may include, for example, polyethylene, polypropylene, or the like. A single layer or multiple layers of two or more layers may be used as the base layer 110. For example, a 2-layered separator of polyethylene/polypropylene, or a combined multi-layered structure such as a 3-layered separator of polyethylene/polypropylene/polyethylene, or a 3-layered separator of polypropylene/polyethylene/polypropylene, may also be used as the base layer 110 of the separator 100.

The base layer 110 may have a thickness in a range of 1 $\mu$M to 100 $\mu$m preferably in a range of 5 $\mu$M to 20 $\mu$m. If the thickness of the base layer 110 is less than 1 $\mu$m, a mechanical strength of the base layer 110 may be lowered. If the thickness of the base layer 110 is greater than 100 $\mu$m, lithium ions may not be easily transferred. The base layer 110 is not particularly limited in view of diameter and porosity of pores. However, the diameter of the pore may be in a range of 0.01 to 50 $\mu$m, preferably in a range of 0.01 $\mu$M to 20 $\mu$m, and the porosity is preferably in a range of 5 to 95%. If the diameter and porosity of the pore are less than 0.01 $\mu$m and 5%, respectively, the base layer 110 may function as a resistance layer. If the diameter and porosity of the pore are greater than 50 $\mu$m and 95%, respectively, a mechanical strength of the base layer 110 may be lowered.

The coating layer 120 is coated on at least one surface of the base layer 110. That is to say, the coating layer 120 may be formed on one surface of the base layer 110 or on both surfaces of the base layer 110. The coating layer 120 may include a plurality of inorganic particles 121 and a binder 122. Here, the inorganic particles 121 may be distributed in the binder 122 in a uniform density. The coating layer 120 may have a thickness in a range of about 0.05 $\mu$m to about 50 $\mu$m preferably in a range of about 0.5 $\mu$m to about 5 $\mu$m.

The plurality of inorganic particles 121 may have empty spaces present there between, forming micropores. The inorganic particles 121 may include, for example, $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, or combinations thereof. Specifically, the inorganic particles 121 may include boehmite (AlO(OH)). The inorganic particles 121 including an inorganic compound may have improved heat resistance, thereby preventing the separator from suddenly shrinking or deforming due to an increase in the temperature.

While there is no particular limitation in particle diameters of the inorganic particles 121, the inorganic particles 121 may have a particle diameter in a range of about 0.01 $\mu$M to about 10 $\mu$m, preferably in a range of about 0.1 $\mu$M to about 1 $\mu$m, to form the coating layer 120 having a uniform thickness, uniform dispersibility and an appropriate porosity. If the particle diameter of the inorganic particles 121 is less than about 0.01 $\mu$m, the dispersibility may be lowered, so that it is difficult to achieve uniform coating. If the particle diameter of the inorganic particles 121 greater than about 10 $\mu$M, the thickness of the coating layer 120 may increase, resulting in deterioration of the mechanical strength and reducing battery capacity. In addition, excessively large pore sizes may cause an internal short circuit during charging/discharging of the secondary battery.

The inorganic particles 121 demonstrate a high mechanical strength and excellent heat resistance at high temperatures. Therefore, if the inorganic particles 121 are coated on a surface of the base layer 110, thermal and mechanical properties of the base layer 110 are improved, and a reduction in the stability due to an internal short circuit between positive and negative electrodes may not be caused even under harsh conditions of high temperature and over-charge, thereby demonstrating thermal and electrochemical stabilities.

The binder 122 may serve to allow the inorganic particles 121 having small particle sizes to be dispersed well without being agglomerated to each other and may allow the coating layer 120 to be well adhered to the base layer 110. The binder 122 may be composed of a first binder or a mixture of a first binder and a second binder.

The first binder may include one selected from the group consisting of polyacrylic acid (PAA), polyacrylate, and a mixture of polyacrylic acid (PAA) and polyacrylate. In particular, sodium acrylate is preferably used as the polyacrylate. In addition, the second binder is a water-based binder selected from the group consisting of a styrene-butadiene rubber (SBR), carboxylmethylcellulose (CMC) and acrylate. For example, the binder 122 may include one selected from the group consisting of polyacrylic acid, polyacrylate, a mixture of polyacrylic acid and polyacrylate, which may be used alone or may be used by blending one selected from the group consisting of polyacrylic acid, polyacrylate, a mixture of polyacrylic acid and polyacrylate with an additional second binder selected from the group consisting of a styrene-butadiene rubber (SBR), carboxylmethylcellulose (CMC) and acrylate.

The first binder preferably has a molecular weight of 100,000 to 1,000,000. In addition, if the binder 122 includes a mixture of the first binder and the second binder, the first binder may be contained in an amount of 50 wt % or greater based on the total weight of the binder. In more detail, the first binder and the second binder may be contained in the binder in a mixing ratio of 50:50 to 100:0, preferably in a mixing ratio of 60:40 to 70:30.

Since the binder including the polyacrylic acid or sodium acrylate has excellent dispersibility with respect to inorganic particles, a packing density of a coating layer 120 formed by coating the base layer 110 using a slurry prepared by mixing the binder with the inorganic particles can be increased, and excellent adhesion to the base layer 110 can be obtained. In more detail, the inorganic particles 121 of the coating layer 120 can effectively prevent the base layer 110 from shrinking at a high temperature of about 130° C. by the excellent dispersibility of the inorganic particles and the excellent adhesion of the coating layer 120, thereby securing reduced thermal shrinkage. Thus, the separator having high heat resistance, which provides excellent dispersibility and reduced thermal shrinkage, can be obtained.

In addition, since the polyacrylic acid (PAA) binder has a hydrophilic functional group, it easily adsorbs into an inorganic material having a hydrophilic surface, thereby forming a binder surface adsorption layer. The binder surface adsorption layer may stick to another adjacent adsorption layer, thereby forming a robust layer.

Figure 2:
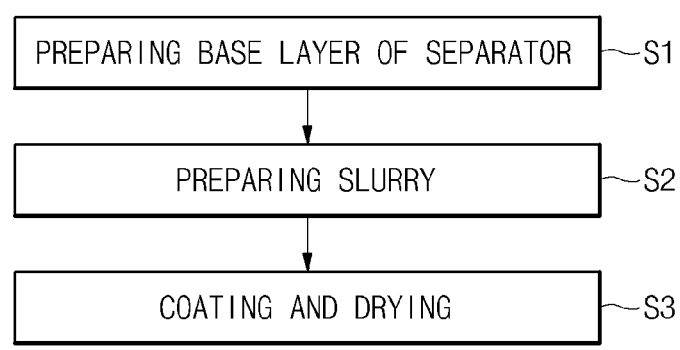
FIG. 2 is a flowchart illustrating a manufacturing method of a separator according to an embodiment.

FIG. 2 is a flowchart illustrating a manufacturing method of a separator according to an embodiment.

Referring to FIG. 2, the manufacturing method of a separator according to an embodiment includes preparing a base layer (S1), preparing a slurry (S2) and coating and drying (S3).

In the preparation of the base layer (S1), a porous base layer is prepared. The base layer may include, for example, glass fiber, polyester, tetrafluoroethylene (TEFLON), polyolefin, polytetrafluoroethylene (PTFE) or combinations thereof. The polyolefin may include, for example, polyethylene, polypropylene, or the like. A single layer or multiple layers of two or more layers may be used as the base layer. For example, a 2-layered separator of polyethylene/polypropylene, or a combined multi-layered structure such as a 3-layered separator of polyethylene/polypropylene/polyethylene or a 3-layered separator of polypropylene/polyethylene/polypropylene, may also be used as the base layer 110 of the separator 100.

The base layer may have a thickness in a range of 1 μm to 100 μm, preferably in a range of 5 μm to 20 μm.

In the preparation of the slurry (S2), the slurry is prepared by mixing inorganic particles, a binder and a solvent. Specifically, the binder and the solvent are mixed to prepare a mixture solution, and the inorganic particles are then added to the mixture solution to be dispersed, thereby preparing the slurry.

After adding of the inorganic particles to the mixture solution, pulverizing of the inorganic particles may further be performed. An appropriate pulverizing time is in a range of about 1 hour to about 20 hours, and particle diameters of pulverized inorganic particles are in a range of about 0.01 μm to about 10 μm, preferably in a range of about 0.1 μm to about 1 μm. As the pulverizing method, a generally accepted method may be used. Particularly, a beads mill method is preferably used as the pulverizing method.

Here, powder-type inorganic particles pre-pulverized into the aforementioned particle size may be used as the inorganic particles, and may be mixed with the mixture solution of the binder and the solvent to then be dispersed. Here, the mixing of the powder-type inorganic particles and the mixture solution may be performed by a mixer comprised of a planetary mixer and a disperser, and an appropriate mixing time is in a range of about 1 hour to about 20 hours.

Alternatively, the slurry may also be prepared by transferring inorganic particles having the aforementioned particle size, a binder and a solvent to a stirring vessel at once and stirring the mixture using stirring blades.

The inorganic particles may include, for example, $Al_2O_3$, $SiO_2$, $TiO_2$, $SnO_2$, $CeO_2$, $MgO$, $NiO$, $CaO$, $ZnO$, $ZrO_2$, $Y_2O_3$, $SrTiO_3$, $BaTiO_3$, $Mg(OH)_2$, or combinations thereof. Specifically, the inorganic particles may include Boehmite (AlO(OH)).

The binder may include one selected from the group consisting of polyacrylic acid, polyacrylate, a mixture of polyacrylic acid and polyacrylate, which may be used alone or may be used by blending one selected from the group consisting of polyacrylic acid, polyacrylate, a mixture of polyacrylic acid and polyacrylate with an additional second binder selected from the group consisting of a styrene-butadiene rubber (SBR), carboxylmethylcellulose (CMC) and acrylate.

Here, the first binder preferably has a molecular weight of 100,000 to 1,000,000. In addition, if the binder 122 includes a mixture of the first binder and the second binder, the first binder may be contained in an amount of 50 wt % or greater based on the total weight of the binder. In more detail, the first binder and the second binder may be contained in the binder in a mixing ratio of 50:50 to 100:0, preferably in a mixing ratio of 60:40 to 70:30.

In the coating and drying (S3), the slurry prepared by the aforementioned method is coated on the base layer and dried, thereby finally forming a coating layer on the base layer. Here, the coating layer may have a thickness in a range of about 0.05 μm to about 50 μm, preferably in a range of about 0.5 μm to about 5 μm. Common coating methods may be used as the coating method of the slurry, and examples thereof may include deep coating, spin coating, roll coating, meyer bar coating, comma coating, die coating, gravure coating, screen printing, offset printing, brush painting, spraying, combinations thereof, and so on. The separator thus formed may be used as a separator for an electrochemical element, preferably a lithium secondary battery wherein, the separator may be interposed between a positive electrode and a negative electrode of a secondary battery.

FIG. 3 is a cross-sectional view of a secondary battery including a separator according to an embodiment.

As shown in FIG. 3, the secondary battery according to an embodiment includes a separator 100, a positive electrode 200 and a negative electrode 300. Here, the separator 100 is the same as described above in the previous embodiment, and a repeated description thereof will be omitted. An electrolyte solution is interposed between the positive electrode 200 and the negative electrode 300.

When the coating layer 120 including the inorganic particles 121 is formed on at least one surface of the base layer 110, active material layers present on the base layer 110, the positive electrode 200 and the negative electrode 300 is structurally prevented from making direct contact with one another. If the active materials make direct contact with one another, they may function as an oxidation catalyst and may cause elution of metal ions while oxidizing the base layer. The coating layer 120 may suppress the elution of the metal ions.

In addition, when the separator 100 having the coating layer 120 coated on at least one surface of the base layer 110 is used, excellent adhesion with respect to an electrode is demonstrated and the dispersibility and heat resistance of the separator 100 are improved, thereby achieving the secondary battery having excellent safety and cycle life characteristics.

Preparation of Separator Having High Resistance

In order to prepare a coating layer slurry, a mixture was first prepared by mixing inorganic particles, a binder and a solvent. Here, boehmite particles were used as the inorganic particles and ion exchange water was used as a solvent. The mixing ratio of the inorganic particles, the binder and the solvent may be 100:6.7:198 (% by weight). Here, the weight ratio (PB) of the boehmite particles to the binder was 15. The slurry includes a solid content of 35%.

The mixture was dispersed with a diameter of 0.8 mm zirconia beads to prepare the slurry.

The slurry was coated on the base layer using a meyer bar coater and dried at 70° C. for 30 minutes to prepare a separator. Here, a 12 μm thick polyethylene microporous membrane was used as the base layer. In addition, the coating layer coated on the base layer was formed to a thickness of 2.5 μm.

Figure 4C:
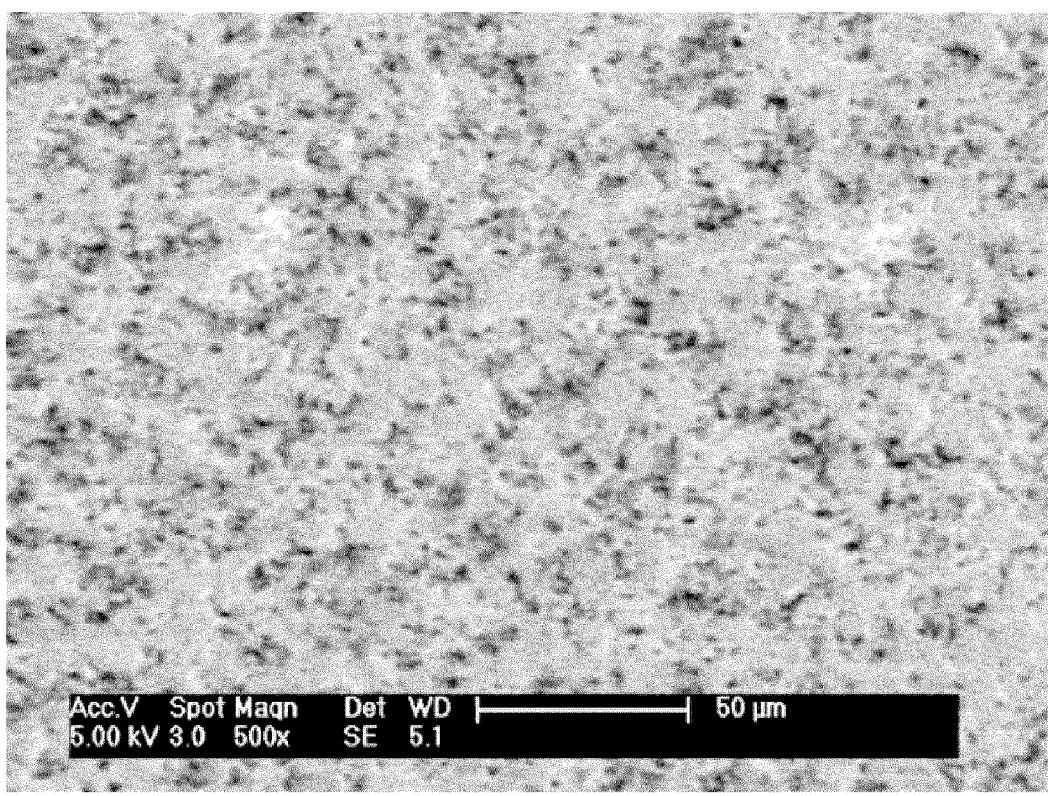

In Examples 1 to 15 that follow, the separators were prepared by the above-described preparation processes by varying conditions of the binders. The dispersibility and thermal shrinkage were measured. The dispersibility was evaluated by measuring, for example, a distribution of particle diameters magnified (×5,000) photographs of a scanning electron microscope (SEM), as shown in FIGS. 4A to 4C. As shown in FIGS. 4A and 4B, when particles are uniformly distributed, it is determined that the particles have relatively good dispersibility (⊚, ○). By contrast, as shown in FIG. 4C, when particles are non-uniformly agglomerated, it is determined that the particles have bad dispersibility (×). The thermal shrinkage (δL/L) was calculated using the following equation:

$$\delta L/L(\%) = 100 \times [L(\text{annealed}) - L(\text{initial})]/L(\text{initial})$$

where L(annealed) indicates a length after annealing the separator and L(initial) indicates an initial length of the separator. In addition, lengths before and after annealing were measured in a machine direction (MD) (i.e., a length direction). The annealing was performed at temperatures of 130° C. and 150° C. each for 1 hour.

Examples 1-5

As the binder, polyacrylic acid (PAA) with different molecular weights was used. The results are shown in Table 1 below.

TABLE 1

| | Binder | Molecular Weight | Dispersibility | Thermal Shrinkage(%) 130° C./ 1 H | Thermal Shrinkage(%) 150° C./ 1 H |
|---|---|---|---|---|---|
| Example 1 | Polyacrylic Acid (PAA) | 3,000,000 | X | 1 | 20 |
| Example 2 | PAA | 1,000,000 | ○ | 2 | 25 |
| Example 3 | PAA | 250,000 | ⊚ | 2 | 29 |
| Example 4 | PAA | 100,000 | ⊚ | 3 | 36 |
| Example 5 | PAA | 3,000 | ⊚ | 7 | 90 |

In Example 1, after dispersion, the particle size distribution was not uniform and the dispersibility was unacceptable. In Example 5, the dispersibility was good and high thermal shrinkage was demonstrated, suggesting that heat resistance was unacceptable. Therefore, as in Examples 2 to 4, desirable results were obtained when the polyacrylic acid (PAA) had a molecular weight in a range of 100,000 to 1,000,000.

Examples 6-10

Polyacrylic acid (PAA) having a molecular weight of 250,000 as the binder and styrene-butadiene rubber (SBR) as a water-based binder were blended. The results are shown in Table 2 below.

TABLE 2

| | Binder | Mixing Ratio (by wt %) | Dispersibility | Thermal Shrinkage (%) 130° C./ 1 H | Thermal Shrinkage (%) 150° C./ 1 H |
|---|---|---|---|---|---|
| Example 6 | PAA/SBR | 100/0 | ⊚ | 2 | 29 |
| Example 7 | PAA/SBR | 75/25 | ⊚ | 2 | 30 |
| Example 8 | PAA/SBR | 67/33 | ○ | 3 | 32 |
| Example 9 | PAA/SBR | 50/50 | ○ | 3 | 35 |
| Example 10 | PAA/SBR | 25/75 | X (Bubbles) | — | — |

In Examples 6 to 10, as the amount of the polyacrylic acid (PAA) was reduced, the dispersibility was lowered and increased thermal shrinkage was demonstrated, showing a tendency to reduce heat resistance. However, the acceptable results were obtained when the mixing ratio was up to 50:50 as in Example 9. Meanwhile, as in Example 10, when the amount of polyacrylic acid (PAA) was less than 50%, some bubbles were shown in the slurry and the dispersibility and heat resistance were bad. Thus when the polyacrylic acid (PAA) is contained in an amount of 50 wt % or greater, preferably in an amount of 67 wt % or greater, based on the total weight of the binder, the desired results were obtained.

Examples 11-12

Polyacrylic acid (PAA) having a molecular weight of 250,000 was used as the binder, and either carboxyl methyl cellulose (CMC) or acrylate as a water-based binder were blended in a ratio of 75:25. The results are shown in Table 3 below.

TABLE 3

| | Binder | Molecular Weight | Dispersibility | Thermal Shrinkage (%) 130° C./ 1 H | Thermal Shrinkage (%) 150° C./ 1 H |
|---|---|---|---|---|---|
| Example 11 | PAA/CMC | 75/25 | ○ | 2 | 28 |
| Example 12 | PAA/acrylate | 75/25 | ○ | 3 | 31 |

In Examples 11 and 12, the separators demonstrated excellent dispersibility and high heat resistance.

Examples 13-15

Sodium polyacrylic acid (PAA-Na) having a molecular weight of 300,000 as the binder, a styrene-butadiene rubber (SBR), carboxyl methyl cellulose (CMC) or acrylate were blended in a ratio of 75:25. The results are shown in Table 4 below.

TABLE 4

| | Binder | Molecular Weight | Dispersibility | Thermal Shrinkage (%) 130° C./ 1 H | Thermal Shrinkage (%) 150° C./ 1 H |
|---|---|---|---|---|---|
| Example 13 | PAA-Na/SBR | 75/25 | ⊚ | 2 | 30 |
| Example 14 | PAA-Na/CMC | 75/25 | ○ | 2 | 28 |
| Example 15 | PAA-Na/acrylate | 75/25 | ○ | 3 | 32 |

In Examples 13 to 15, the separators demonstrated excellent dispersibility and high heat resistance.

As confirmed from the results of Examples 1 to 15, the molecular weight of polyacrylic acid or sodium acrylate as the binder is preferably in a range of 100,000 to 1,000,000. In addition, when polyacrylic acid or sodium acrylate is blended with one water-based binder selected from the group consisting of a styrene-butadiene rubber (SBR), carboxyl methyl cellulose (CMC) and acrylate, the polyacrylic acid or the sodium polyacrylic acid is contained in an amount of 50% or greater, preferably 67% or greater. In this case, it was confirmed that the obtained separator had excellent dispersibility and high heat resistance.

Described above are a separator exhibiting high heat resistance, a manufacturing method for the separator, and a secondary battery having the separator according to the present embodiments have been particularly shown and described with reference to exemplary embodiments thereof, it will be understood by those of ordinary skill in the art that various changes in form and details may be made therein without departing from the spirit or scope of the present disclosure as set forth in the following claims. It is therefore desired that the present embodiments be considered in all respects as illustrative and not restrictive, reference being made to the appended claims rather than the foregoing description to indicate the scope of the disclosure.

What is claimed is:

1. A separator comprising:
   a porous base layer; and
   a coating layer formed on at least one surface of the base layer,
   wherein the coating layer includes inorganic particles and a binder,
   wherein the binder is a mixture of a first binder and a second binder;
   wherein the inorganic particles include Boehmite (AlO(OH));
   the first binder includes one selected from the group consisting of polyacrylic acid (PAA), polyacrylate or a mixture of polyacrylic acid (PAA) and polyacrylate, having a molecular weight of 100,000 to 1,000,000;
   wherein the second binder is one water-based binder selected from the group consisting of a styrene-butadiene rubber (SBR), carboxylmethylcellulose (CMC) and acrylate; and
   wherein the first binder and the second binder are contained in the binder in a mixing ratio of 50:50 to 75:25.

2. The separator of claim 1, wherein the polyacrylate is sodium polyacrylate.

3. The separator of claim 1, wherein the first binder is polyacrylic acid having a molecular weight of about 1,000,000.

4. The separator of claim 1, wherein the first binder is polyacrylic acid having a molecular weight of about 250,000.

5. The separator of claim 1, wherein the first binder is polyacrylic acid having a molecular weight of about 100,000.

6. A secondary battery including the separator of claim 1.

7. A manufacturing method of a separator, comprising:
   preparing a porous base layer;
   preparing a slurry by mixing inorganic particles, a binder wherein the binder is a mixture of the first binder and a second binder and a solvent; and forming a coating layer by coating the slurry on at least one surface of the base layer and drying the coated slurry,
   wherein the inorganic particles include Boehmite (AlO(OH));
   wherein the first binder includes one selected from the group consisting of poly acrylic acid (PAA), polyacrylate or a mixture of poly acrylic acid (PAA) and polyacrylate, having a molecular weight of 100,000 to 1,000,000;
   wherein the second binder is one water-based binder selected from the group consisting of a styrene-butadiene rubber (SBR), carboxylmethylcellulose (CMC) and acrylate; and
   wherein the first binder and the second binder are contained in the binder in a mixing ratio of 50:50 to 75:25.

8. The manufacturing method of claim 7, wherein the polyacrylate is sodium polyacrylate.

9. The manufacturing method of claim 7, wherein the first binder is polyacrylic acid having a molecular weight of about 1,000,000.

10. The manufacturing method of claim 7, wherein the first binder is polyacrylic acid having a molecular weight of about 250,000.

11. The manufacturing method of claim 7, wherein the first binder is polyacrylic acid having a molecular weight of about 100,000.

* * * * *